US011378497B2

(12) United States Patent
Minuti et al.

(10) Patent No.: US 11,378,497 B2
(45) Date of Patent: Jul. 5, 2022

(54) TISSUE PROCESSOR

(71) Applicant: MILESTONE S.r.l., Sorisole (IT)

(72) Inventors: Matteo Minuti, Brignano Gera d'Adda (IT); Francesco Visinoni, Mozzo (IT)

(73) Assignee: MILESTONE S.r.l., Sorisole (IT)

( * ) Notice: Subject to any disclaimer, the term of this patent is extended or adjusted under 35 U.S.C. 154(b) by 434 days.

(21) Appl. No.: 16/002,409

(22) Filed: Jun. 7, 2018

(65) Prior Publication Data
US 2019/0033179 A1 Jan. 31, 2019

(30) Foreign Application Priority Data

Jul. 31, 2017 (EP) ..................................... 17183964

(51) Int. Cl.
*G01N 1/30* (2006.01)
*G01N 35/00* (2006.01)
*B01L 3/00* (2006.01)
*G01N 1/36* (2006.01)
*G01N 1/31* (2006.01)

(52) U.S. Cl.
CPC ................ *G01N 1/30* (2013.01); *B01L 3/523* (2013.01); *G01N 1/31* (2013.01); *G01N 1/36* (2013.01); *G01N 35/0092* (2013.01); *G01N 35/0095* (2013.01); *G01N 35/0099* (2013.01); *B01L 2300/04* (2013.01); *B01L 2300/045* (2013.01);
(Continued)

(58) Field of Classification Search
CPC .. G01N 1/30; G01N 1/31; G01N 1/36; G01N 2035/00346; G01N 2035/00851; G01N 35/0092; G01N 35/0095; G01N 35/0097; G01N 35/0099; G01N 35/00732; B01L 3/523; B01L 3/527; B01L 3/0289; B01L 3/0293; B01L 2300/02; B01L 2300/04; B01L 2300/045; B01L 13/00
See application file for complete search history.

(56) References Cited

U.S. PATENT DOCUMENTS 6,395,234 B1 * 5/2002 Hunnell .................... G01N 1/36
220/831
6,803,018 B1 * 10/2004 Stiller ....................... G01N 1/31
422/535

(Continued)

*Primary Examiner* — Benjamin R Whatley
*Assistant Examiner* — Austin Q Le
(74) *Attorney, Agent, or Firm* — The H.T. Than Law Group (57) ABSTRACT

The invention relates to a tissue processor (100) for automatically processing histological tissue specimens, the tissue processor (100) comprising a plurality of containers (1, 2, 3, 4, 5, 6, 7) each being provided for a respective histological process for processing at least one tissue carrier, a robotic arm (9) for handling a tissue carrier between the containers (1, 2, 3, 4, 5, 6, 7) for being processed in each of the containers (1, 2, 3, 4, 5, 6, 7), and a control unit for controlling the histological process in each of the containers (1, 2, 3, 4, 5, 6, 7) and for controlling the robotic arm (9), wherein the control unit is configured such that the robotic arm (9) handles a tissue carrier between the containers (1, 2, 3, 4, 5, 6, 7) while the histological process in each of the containers (1, 2, 3, 4, 5, 6, 7) continues in an uninterrupted fashion, so that the execution of the process for each tissue carrier is independent from the loading order and/or process duration of other tissue carriers being processed in the containers (1, 2, 3, 4, 5, 6, 7).

21 Claims, 8 Drawing Sheets

(52) U.S. Cl.
CPC ............ *G01N 35/00732* (2013.01); *G01N 2035/00346* (2013.01); *G01N 2035/00851* (2013.01)

(56) References Cited

U.S. PATENT DOCUMENTS

| | | | |
|---|---|---|---|
| 2008/0113440 A1 | 5/2008 | Gurney et al. | |
| 2010/0216222 A1* | 8/2010 | Ulbrich ............... | G01N 1/31 435/284.1 |
| 2012/0149059 A1 | 6/2012 | Shah | |
| 2013/0017535 A1* | 1/2013 | Frey ................. | G01N 35/0099 435/5 |
| 2014/0120011 A1* | 5/2014 | Eckert ................ | G01N 1/31 422/536 |
| 2014/0273085 A1 | 9/2014 | Eckert et al. | |
| 2016/0097701 A1* | 4/2016 | Mohmmadizand ............. | G01N 35/00871 435/283.1 |

\* cited by examiner

| OPERATION | Tissue thickness | | |
|---|---|---|---|
| | 1mm | 2mm | 3mm |
| Transfer time from loading bay to fixation retort (seconds) | 15 | 15 | 15 |
| Fixation time inside the fixation retort at 50°C (seconds) | 900 | 1200 | 1800 |
| Transfer time from fixation retort to flushing retort (seconds) | 15 | 15 | 15 |
| Flushing time inside the flushing retort at room temperature (seconds) | 15 | 15 | 15 |
| Transfer time from flushing retort to rinsing1 retort (seconds) | 15 | 15 | 15 |
| Rinsing time inside the rinsing1 retort at room temperature (seconds) | 15 | 15 | 15 |
| Transfer time from rinsing1 retort to rinsing2 retort (seconds) | 15 | 15 | 15 |
| Rinsing time inside the rinsing2 retort at room temperature (seconds) | 15 | 15 | 15 |
| Transfer time from rinsing2 retort to ethanol retort (seconds) | 15 | 15 | 15 |
| Dehydration time inside the ethanol retort at 65°C (seconds) | 900 | 1200 | 1500 |
| Transfer time from ethanol retort to isopropanol retort (seconds) | 15 | 15 | 15 |
| Clearing time inside the ethanol retort at 68°C (seconds) | 900 | 1800 | 4300 |
| Transfer time from isopropanol retort to dripping area (seconds) | 15 | 15 | 15 |
| Dripping time in the dripping area (seconds) | 15 | 15 | 15 |
| Transfer time from dripping area to wax retort (seconds) | 15 | 15 | 15 |
| Impregnation and embedding time inside the wax retort at 82°C (seconds) | 1500 | 3300 | 4500 |
| Transfer time from wax retort to -20°C etahnol container (seconds) | 15 | 15 | 15 |
| Wax hardening time inside the -20°C etahnol container (seconds) | 30 | 30 | 30 |
| transfer time from -20°C etahnol container to final collecting box (seconds) | 15 | 15 | 15 |
| total time (seconds) | 4440 | 7740 | 12180 |
| total time (hours) | 1:14 | 2:09 | 3:23 |

Fig. 7

| Timeline (hh,min,sec) Start | Timeline (hh,min,sec) End | Operation time (seconds) | Cassette | Operation |
|---|---|---|---|---|
| 00:00:00 | 00:00:15 | 15 | Cassette 1 | Process start: transfer from loading bay to fixation retort |
| 00:00:15 | 00:15:15 | 900 | Cassette 1 | Fixation inside the fixation retort at 50°C |
| 00:01:30 | 00:01:45 | 15 | Cassette 2 | Process start: transfer from loading bay to fixation retort |
| 00:01:45 | 00:31:45 | 1800 | Cassette 2 | Fixation inside the fixation retort at 50°C |
| 00:03:00 | 00:03:15 | 15 | Cassette 3 | Process start: transfer from loading bay to fixation retort |
| 00:03:15 | 00:23:15 | 1200 | Cassette 3 | Fixation inside the fixation retort at 50°C |
| 00:15:15 | 00:15:30 | 15 | Cassette 1 | Transfer from fixation retort to flushing retort |
| 00:15:30 | 00:15:45 | 15 | Cassette 1 | Flushing inside the flushing retort at room temperature |
| 00:15:45 | 00:16:00 | 15 | Cassette 1 | Transfer from flushing retort to rinsing1 retort |
| 00:16:00 | 00:16:15 | 15 | Cassette 1 | Rinsing inside the rinsing1 retort at room temperature |
| 00:16:15 | 00:16:30 | 15 | Cassette 1 | Transfer from rinsing1 retort to rinsing2 retort |
| 00:16:30 | 00:16:45 | 15 | Cassette 1 | Rinsing inside the rinsing2 retort at room temperature |
| 00:16:45 | 00:17:00 | 15 | Cassette 1 | Transfer from rinsing2 retort to ethanol retort |
| 00:17:00 | 00:32:00 | 900 | Cassette 1 | Dehydration inside the ethanol retort at 65°C |
| 00:23:15 | 00:23:30 | 15 | Cassette 3 | Transfer from fixation retort to flushing retort |
| 00:23:30 | 00:23:45 | 15 | Cassette 3 | Flushing inside the flushing retort at room temperature |
| 00:23:45 | 00:24:00 | 15 | Cassette 3 | Transfer from flushing retort to rinsing1 retort |
| 00:24:00 | 00:24:15 | 15 | Cassette 3 | Rinsing inside the rinsing1 retort at room temperature |
| 00:24:15 | 00:24:30 | 15 | Cassette 3 | Transfer from rinsing1 retort to rinsing2 retort |
| 00:24:30 | 00:24:45 | 15 | Cassette 3 | Rinsing inside the rinsing2 retort at room temperature |
| 00:24:45 | 00:25:00 | 15 | Cassette 3 | Transfer from rinsing2 retort to ethanol retort |
| 00:25:00 | 00:45:00 | 1200 | Cassette 3 | Dehydration inside the ethanol retort at 65°C |
| 00:31:45 | 00:32:00 | 15 | Cassette 2 | Transfer from fixation retort to flushing retort |
| 00:32:00 | 00:32:15 | 15 | Cassette 1 | Transfer from ethanol retort to isopropanol retort |
| 00:32:00 | 00:32:15 | 15 | Cassette 2 | Flushing inside the flushing retort at room temperature |
| 00:32:15 | 00:47:15 | 900 | Cassette 1 | Clearing inside the ethanol retort at 68°C |
| 00:32:15 | 00:32:30 | 15 | Cassette 2 | Transfer from flushing retort to rinsing1 retort |
| 00:32:30 | 00:32:45 | 15 | Cassette 2 | Rinsing inside the rinsing1 retort at room temperature |
| 00:32:45 | 00:33:00 | 15 | Cassette 2 | Transfer from rinsing1 retort to rinsing2 retort |
| 00:33:00 | 00:33:15 | 15 | Cassette 2 | Rinsing inside the rinsing2 retort at room temperature |

Fig. 8

| | | | | |
|---|---|---|---|---|
| 00:33:15 | 00:33:30 | 15 | Cassette 2 | Transfer from rinsing2 retort to ethanol retort |
| 00:33:30 | 00:58:30 | 1500 | Cassette 2 | Dehydration inside the ethanol retort at 65°C |
| 00:45:00 | 00:45:15 | 15 | Cassette 3 | Transfer from ethanol retort to isopropanol retort |
| 00:45:15 | 01:15:15 | 1800 | Cassette 3 | Clearing inside the ethanol retort at 68°C |
| 00:47:15 | 00:47:30 | 15 | Cassette 1 | Transfer from isopropanol retort to dripping area |
| 00:47:30 | 00:47:45 | 15 | Cassette 1 | Dripping in the dripping area |
| 00:47:45 | 00:48:00 | 15 | Cassette 1 | Transfer from dripping area to wax retort |
| 00:48:00 | 01:13:00 | 1500 | Cassette 1 | Impregnation and embedding inside the wax retort at 82°C |
| 00:58:30 | 00:58:45 | 15 | Cassette 2 | Transfer from ethanol retort to isopropanol retort |
| 00:58:45 | 02:10:25 | 4300 | Cassette 2 | Clearing inside the ethanol retort at 68°C |
| 01:13:00 | 01:13:15 | 15 | Cassette 1 | Transfer from wax retort to -20°C etahnol container |
| 01:13:15 | 01:13:45 | 30 | Cassette 1 | Wax hardening inside the -20°C etahnol container |
| 01:13:45 | 01:14:00 | 15 | Cassette 1 | Process end: transfer from -20°C etahnol container to final collecting box |
| 01:15:15 | 01:15:30 | 15 | Cassette 3 | Transfer from isopropanol retort to dripping area |
| 01:15:30 | 01:15:45 | 15 | Cassette 3 | Dripping in the dripping area |
| 01:15:45 | 01:16:00 | 15 | Cassette 3 | Transfer from dripping area to wax retort |
| 01:16:00 | 02:11:00 | 3300 | Cassette 3 | Impregnation and embedding inside the wax retort at 82°C |
| 02:10:25 | 02:10:40 | 15 | Cassette 2 | Transfer from isopropanol retort to dripping area |
| 02:10:40 | 02:10:55 | 15 | Cassette 2 | Dripping in the dripping area |
| 02:10:55 | 02:11:10 | 15 | Cassette 2 | Transfer from dripping area to wax retort |
| 02:11:00 | 02:11:10 | 10 | Cassette 3 | Delay: robotic arm busy transferring Cassette 2 |
| 02:11:10 | 02:11:25 | 15 | Cassette 3 | Transfer from wax retort to -20°C etahnol container |
| 02:11:10 | 03:26:10 | 4500 | Cassette 2 | Impregnation and embedding inside the wax retort at 82°C |
| 02:11:25 | 02:11:55 | 30 | Cassette 3 | Wax hardening inside the -20°C etahnol container |
| 02:11:55 | 02:12:10 | 15 | Cassette 3 | Process end: transfer from -20°C etahnol container to final collecting box |
| 03:26:10 | 03:26:25 | 15 | Cassette 2 | Transfer from wax retort to -20°C etahnol container |
| 03:26:25 | 03:26:55 | 30 | Cassette 2 | Wax hardening inside the -20°C etahnol container |
| 03:26:55 | 03:27:10 | 15 | Cassette 2 | Process end: transfer from -20°C etahnol container to final collecting box |

Fig. 8 cont.

TISSUE PROCESSOR

1. FIELD OF THE INVENTION

The present invention relates to a tissue processor for automatically processing histological tissue specimens and a method using such a tissue processor for automatically processing histological tissue specimens.

2. TECHNICAL BACKGROUND

Usually, tissue specimens or tissue samples are taken at a hospital and subsequently transferred to a laboratory or the like for histological examination. For a histological examination of human and/or animal tissue specimens, the tissue specimens are collected from the patients by a clinician in an ambulatory environment (biopsies) or by surgeons during a surgery. After that, the tissue specimens are placed in suitable transportation carriers such as a container. The transportation carrier is typically filled with a fixative such as formalin and sent to the histology laboratory for final examination.

After the histology laboratory has received the tissue specimens, the first operation performed by a histotechnician is the accessioning and grossing.

The accessioning consists of a registration of the incoming tissues and insertion of the data in the laboratory information system (LIS). In this phase, a unique tissue code is assigned to the tissue specimen. More specifically, tissue specimens are received, sorted, labeled, e.g. with a barcode label on a carrier such as a container or cassette in which the tissue specimens are already received and/or in which the tissue specimens will be placed, and related data is entered into the LIS (Laboratory Information System). The data includes, e.g., patient name, required examination, type of the tissue specimen (e.g., organ name), number and/or size of the tissue specimens.

During the following grossing step, the tissue specimen is removed from the carrier, e.g. a transportation carrier, and reduced in a way that is suitable for the next processes. The reduced tissue specimen is subsequently placed inside a tissue carrier. The reduced tissue specimen must be small enough to be contained inside the tissue carrier, which is, e.g., a standard (histological) tissue cassette. Some tissue specimens, e.g. small biopsies, are usually already small enough so that the reduction is not required. After the preparation, the tissue carrier is usually grouped together with several other tissue carriers inside a rack or a rack container. A rack may hold from a few tens to a few hundreds of tissue carriers. The rack is then used to process several tissue carriers together at the same time inside a tissue processor. The group of several tissue carriers inside one or more racks is usually named "batch".

In a next step, processing of the tissue specimens is started. Therefore, the rack is provided in a corresponding tissue processor where—in a first step—the tissue specimens are fixed by use of a fixative solution (e.g. formalin). In a second step, the tissue specimens are dehydrated by use of dehydration reagents (e.g. ethanol). In a third step, the tissue specimens are cleared by use of a clearing reagent (e.g. isopropyl alcohol or xylene). In a fourth step, the tissue specimens are impregnated (or infiltrated) by use of paraffin wax. The time required for processing may usually take from half an hour up to 48 hours.

The embedding—which is not commonly considered part of the processing and is an operation usually done outside of the tissue processor—is usually done manually or, less commonly, with an automated embedder. The embedding steps are required to completely fill the tissue carrier and the impregnated tissue specimen with paraffin wax, creating a solid block. Afterwards, the block is cut and the slides are prepared and finally put under a microscope for a corresponding analysis.

In the previously described steps, in particular in the processing and embedding step, a proper selection of the process related to the type of sample (e.g. organ type), size of the tissue specimens and/or urgency are critical for the proper preparation of tissue specimens for the diagnosis process. However, it is well known that the existing tissue processors of processing multiple tissue specimens do not apply a specific process for each single tissue carrier or tissue specimen: several tissue carriers are grouped together forming a batch and the process applied to the tissue specimens is the same for the whole batch.

In the prior art, a tissue processor called continuous flow tissue processor is known. This kind of tissue processor is usually composed of several containers, i.e. retorts, each one with a proper reagent, in which the batches are put in a specific sequence for a specific amount of time. This kind of tissue processor can be continuously fed with small batches, so that the processor can process several batches together one after the other, with a small time shift between each batches and with a First-In-First-Out (FIFO) queuing. The minimum time shift between the batches is usually determined by the time required from one batch process to free the first container, making this container ready to be used to start the following batch process. The continuous flow tissue processor is useful when the time required from the operator to prepare one batch is similar to the time required by the tissue processor to free the first container from the previous batch, thus enhancing the workflow smoothing work peaks.

The tissue processors described above have the following limitations:

The tissue specimens are processed in batches. This means that different tissue specimens that require different processes are processed together with a common process. These processes must accommodate the needs of different tissue specimens, forcing for a compromise between speed and quality of the process. To avoid compromises, grouping similar tissue types (e.g., same organ type and same thickness) in the same batch is required, but it is not usually feasible in the real workflow: the collection of tissue specimens from patients is not scheduled and sorted based on tissue type/size basis. It is true that, using a continuous flow tissue processor, it is theoretically possible to process batches composed of only one tissue carrier with only one tissue specimen. However, it is not practically feasible: the number of tissues/tissue specimens processed in two or three hours with a continuous flow tissue processor used with "single-tissue batches" would be about 10 or 15 or less, instead of several hundreds of tissue specimens. For this reason, this way would be economically unprofitable and is therefore disadvantageous.

The tissue specimens (or tissue carriers) grouped in batches are loaded one after the other and processed in sequence, with a "first-in first-out" (FIFO) queuing. This means, for example, that a batch that requires a fast process could be slowed down by a previous ongoing batch process that requires a long time.

Because of the FIFO queuing, there is no possibility to manage a priority for urgent tissue specimens: if a process is already in execution, the urgent tissue carrier or tissue specimen must wait to be processed within the next batch. Moreover, a previous ongoing batch process that requires a long time could further slowdown the urgent tissue specimens, since the urgent tissue specimen process cannot go over the ongoing processes.

Grouping the tissue specimens in batches means that the tissue specimens are not processed immediately after the grossing: it is necessary to wait for the preparation of all the tissue specimens that have to be grouped together in the same batch. This method introduces useless delays, workflow pikes and the need of a proper buffer space to collect the prepared tissue specimens. The buffer space is usually a container filled by a proper holding solution, usually formalin, which avoids the degradation of the tissue specimens. Formalin is a hazardous reagent; reducing the exposure of the operator to this reagent is a significant improvement. Avoiding this formalin-filled container can reduce the operator exposure to formalin.

Therefore, it is an object of the present invention to provide a tissue processor and a method for tissue processing using the same, which overcome the aforementioned drawbacks.

These and other objects, which become apparent upon reading the following description, are solved by the subject-matter of the independent claims. The dependent claims refer to preferred embodiments of the invention.

3. SUMMARY OF THE INVENTION

According to the invention, a tissue processor for automatically processing (preferably processing including embedding) histological tissue specimens comprises a plurality of containers each being provided for a respective histological process for processing at least one tissue carrier, a robotic arm for handling a tissue carrier between the containers for being processed in each of the containers, and a control unit for controlling the histological process in each of the containers and for controlling the robotic arm. The control unit is configured such that the robotic arm handles a tissue carrier between the containers while the histological process in each of the containers continues in an uninterrupted fashion, so that the execution of the histological process for each tissue carrier is independent from the loading order and/or process duration of other tissue carriers being processed in the containers.

In the context of the present invention, "processing a tissue carrier" is preferably to be understood as processing, i.e. fixing, flushing, rinsing, dehydrating, clearing, and/or impregnating and embedding, more preferred at least processing including embedding, one or more tissue specimens being carried by the tissue carrier.

In the context of the present invention, "handling a tissue carrier between the containers" is preferably to be understood as transferring a tissue carrier, e.g. from one position (e.g. from one container, i.e. out of the container) to another position (e.g. to another container, i.e. inside the other container).

In the invention, the respective histological process preferably corresponds, e.g., to fixing, flushing, rinsing, dehydrating, clearing, and/or impregnating and/or embedding. For each processing step there is preferably provided at least one (independent) container.

In other words, the tissue processor according to the invention provides a tissue processor, which can automatically process (preferably also including the step of embedding) a single tissue carrier without being dependent on other tissue carriers being concurrently processed by the tissue processor. In particular, a tissue carrier does not need to wait for another tissue carrier, i.e. tissue carriers can be loaded in the tissue processor one-by-one, so that a tissue carrier can be processed more efficiently, that is in particular faster and with a higher quality. The tissue processor thus generates an independent flow, in particular a specific and tailored protocol, for each of the tissue carriers being processed by the tissue processor. Having such a tissue processor, grouping several tissue carriers in a batch is not necessary. With the independent flow, also delivery of each processed tissue carrier is independent from the loading order. With such a configuration it is in particular possible that after a tissue carrier is finished in the preparatory process steps before tissue processing, e.g. after grossing, the tissue carrier can immediately start tissue processing in the tissue processor. Thus, the tissue processor also optimizes the flow and smooths the pike times. Furthermore, since a tissue carrier does not need to wait for other tissue carriers to be grouped and processed altogether, a buffer container, in which the tissue carriers are temporarily stored waiting for grouping, is not needed. The buffer container is usually filled by a proper holding solution, e.g., a fixative, which avoids the degradation of the tissue. The most used fixative used as a holding solution is formalin, which is a hazardous reagent. Having such a tissue processor, fumes, which may come from a fixative of the tissue carriers and/or buffer and transportation containers, can be severely reduced, since the fixative-filled buffer container is not required. In summary, the tissue processor particularly provides a means for individually processing tissue carriers so that a tissue carrier can be histologically processed in exactly the time necessary for processing the tissue carrier.

Preferably, the tissue processor comprises a reading unit, e.g. an optical reading unit such as a barcode scanner and/or a near field technology reader such as an RFID reader. The reading unit may be provided for reading a priority for prioritized processing of a tissue carrier over other tissue carriers. Alternatively or additionally the reading unit may be provided for reading tissue characteristics of a tissue carrier, i.e. tissue characteristics of one or more tissue specimens provided in the tissue carrier, wherein the tissue characteristics comprises, e.g., tissue dimension (tissue thickness, tissue length, tissue width etc.) and/or tissue type (e.g., type of organ from which the tissue specimen has been taken). The priority and/or the tissue characteristics are preferably provided with respect to the tissue carrier, e.g. by means of a 2D barcode and/or by means of near field technology such as RFID. The priority and/or the tissue characteristics may also be provided on a distanced server, e.g. on a Local Area Network (LAN), so that the barcode and/or the near field technology provides a unique identification of the tissue carrier linked to the priority and/or the tissue characteristics being provided on the distanced server. The reading unit is connected to the control unit for forwarding the priority and/or the tissue characteristics to the control unit, wherein the control unit is configured such that tissue carriers are processed based on their priorities and/or tissue characteristics.

By means of the priority it can be achieved that if, e.g., two or more tissue carriers have to be handled at the same time, the tissue carrier having the higher priority with respect to the other tissue carriers is handled before the other tissue carriers. As such, tissue processing on the tissue processor is rescheduled, so that tissue carriers which need to be urgently processed can be quickly processed by the tissue processor. Furthermore, an efficient control of the tissue processor is achieved. Using the priority is in particular advantageous, in case the tissue processor is used at the maximum of its capacity.

By processing the tissue carriers based on their tissue characteristics, the tissue processor can be adapted to the needs of the tissue carrier to be processed. Thus, the tissue carrier is processed more efficiently, i.e. in particular in the exact amount of time necessary for processing the tissue carrier, and with a higher quality.

The tissue processor may comprise a dripping area, wherein the control unit is configured such that the robotic arm handles the tissue carrier for dripping off residual liquid over the dripping area, e.g. by an impulse of the robotic arm such as vibration. Dripping off residual liquid, e.g. reagents of a previous histological process, effects that the subsequent container is not contaminated by the liquid of the previous container. Therefore, the overall quality of processing tissue specimens by the tissue processor is improved. Preferably, dripping off residual liquid over the dripping area takes place before, more preferably directly before, the tissue carrier being processed in a container being provided for impregnating and embedding.

Preferably, the tissue processor comprises a loading area, wherein the control unit is configured such that the robotic arm picks up a tissue carrier from the loading area for being processed in the containers. Therefore, an operator can prepare and subsequently load a tissue carrier on the loading area without the need of being in contact or in the close vicinity of the containers. Thus, in particular contamination of an operator by the containers is avoided and a safer tissue processor is achieved. Furthermore, an operator does not require to load a rack or the like, therefore achieving a more efficient and safer process for processing histological tissue specimens.

The tissue processor may further comprise a cooling container for cooling tissue specimens, preferably by means of a cooling liquid, wherein the control unit is configured such that the robotic arm dips the tissue carrier in the cooling container after being processed in the containers. By cooling the tissue specimens, in particular by shock freezing the tissue specimens, the external surface of the tissue specimens thus becomes hard and solid. Cooling the tissue carrier is in particular advantageous after embedding, so that the external surface of the embedded tissue specimens contained inside the tissue carrier quickly solidifies, therefore creating a thick solid wax skin. Such a wax embedded tissue with the tissue carrier is usually called histological block.

Preferably, the tissue processor comprises an unloading area, e.g. a collecting box, wherein the control unit is configured such that the robotic arm handles the tissue carrier for being collected by the unloading area after being processed in the containers. It is particularly advantageous when the tissue carrier is being collected by the unloading area after being cooled by the cooling container. With the unloading area, in particular contamination of an operator by the containers is avoided, so that a safer tissue processor is achieved. Furthermore, there is no need any more that an operator unloads a tissue carrier from a rack or the like, therefore also achieving a more efficient process for processing histological tissue specimens.

Each of the containers may comprise a lid (or a cover) for sealingly closing the respective container, the lid being designed such that the robotic arm can access the container via the lid for placing a tissue carrier in the container. By means of the lid it is in particular avoided that liquid, e.g. reagents, and/or fumes evaporating from the liquid can escape the container while at the same time it is allowed that the robotic arm can access the container for placing a tissue carrier in the container. Thus, a more efficient and safer tissue processor is achieved.

The lid may comprise an accessing means, preferably one or more flaps, for accessing the container, wherein the accessing means can be moved by the robotic aim between a closed position for sealingly closing the container (together with the lid) and an opened position for accessing the container. The accessing means may be biased for being moved in the closed position. Therefore, it is ensured that the accessing means and the lid always securely seal the container.

Preferably, the lid of at least one container of the containers is movably, in particular pivotably, provided on the container for being moved automatically and/or by means of the robotic arm, so that the robotic arm can find a free space for the tissue cassette in the container. Therefore, the robotic arm can find a free space for a tissue carrier inside of the container, while at the same time the lid sealingly closes the container. Automatically moving the lid may be performed directly by means of the control unit. Moving the lid by means of the robotic arm may be performed by means of the robotic arm penetrating the accessing means. As such, the lid moves together with the movements of the robotic arm. By moving the lid by means of the robotic arm, a free space for the tissue carrier can be found in the container without providing additional means for observing the space inside of the container and for moving the lid. In the preferred embodiment, (only) each of the containers having a capacity of more than two tissue carriers is movable.

Preferably, each of the containers comprises a retainer for storing one or more tissue carriers, the retainer having a capacity being dependent on the processing time of the respective histological process, so that the longer the processing time the greater the capacity. As such, the tissue processor can efficiently, i.e. quickly, process tissue carriers, while being compact at the same time.

In a particularly preferred embodiment, the containers comprise/includes a container for fixing, e.g. having a capacity of 25 tissue carriers, a container for flushing, e.g. having a capacity of 2 tissue carriers, at least one, preferably two, containers for rinsing, each having, e.g., a capacity of 2 or 4 tissue carriers, a container for dehydrating, e.g. having a capacity of 25 tissue carriers, a container for clearing, e.g. having a capacity of 60 tissue carriers, and/or a container for impregnating and embedding, e.g. having a capacity of 60 tissue carriers.

Each of the containers may comprise a heater, a stirrer and/or a pump, the heater, the stirrer and/or the pump being connected to the control unit for being controlled by the control unit. Thus, the control unit can control the heater, the stirrer and/or the pump for performing the respective histological process in each of the containers. In particular, the stirrer for stirring the liquid inside of the container avoids a stratification of temperature and enhances the reaction of the liquid, e.g. reagent, with the tissue carrier.

The tissue carrier may be a tissue cassette for carrying a tissue specimen. As such, in particular liquid of the respective histological process can reach the tissue specimen via the tissue cassette.

The tissue carrier may further comprise a base mold for carrying a tissue specimen, wherein the tissue cassette is connectable with the mold for enclosing a chamber for the tissue specimen being carried by the base mold. The base mold may, in particular, be provided for holding a quantity of wax enough to embed a tissue specimen inside of the tissue carrier, in particular inside of the tissue cassette.

According to a further aspect of the invention, a method is provided for automatically processing histological tissue specimens. The histological tissue specimens are processed with a tissue processor as explained above, wherein the method comprises the step of handling a tissue carrier by means of the robotic arm between the containers while the histological process in each of the containers continues in an uninterrupted fashion, so that the execution of the histological process for each tissue carrier is independent from the loading order and/or process duration of other tissue carriers being processed in the containers.

4. DESCRIPTION OF A PREFERRED EMBODIMENT

In the following, the invention is described exemplarily with reference to the enclosed figures, in which

FIG. 7 is a table showing an exemplary protocol for processing different tissue specimens by the tissue processor;

FIG. 8 is a table showing an exemplary timeline for concurrently processing the different tissue specimens of FIG. 7.

Figure 1:
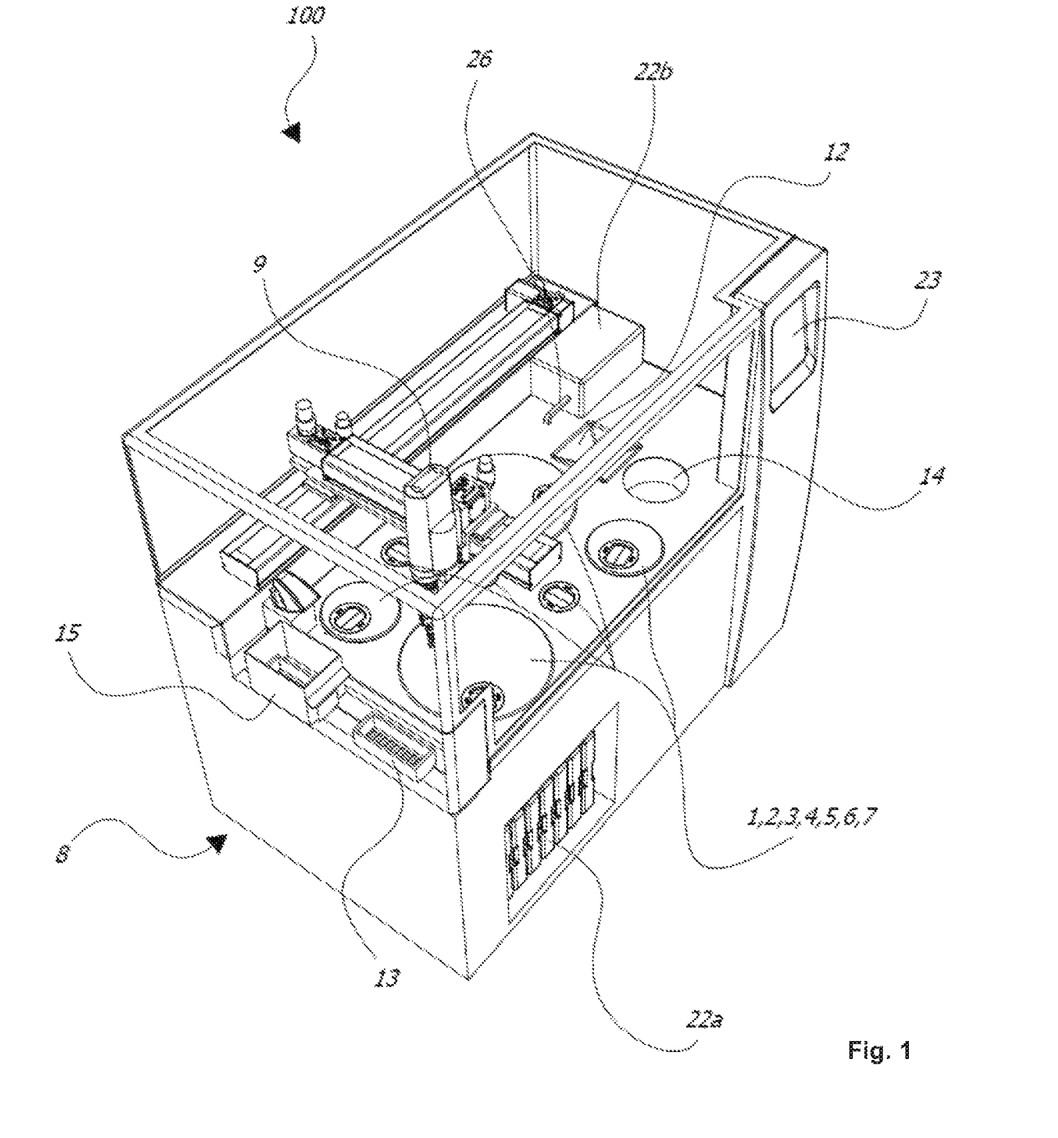
FIG. 1 is a perspective view of an exemplary embodiment of the tissue processor according to the invention.
Figure 2:
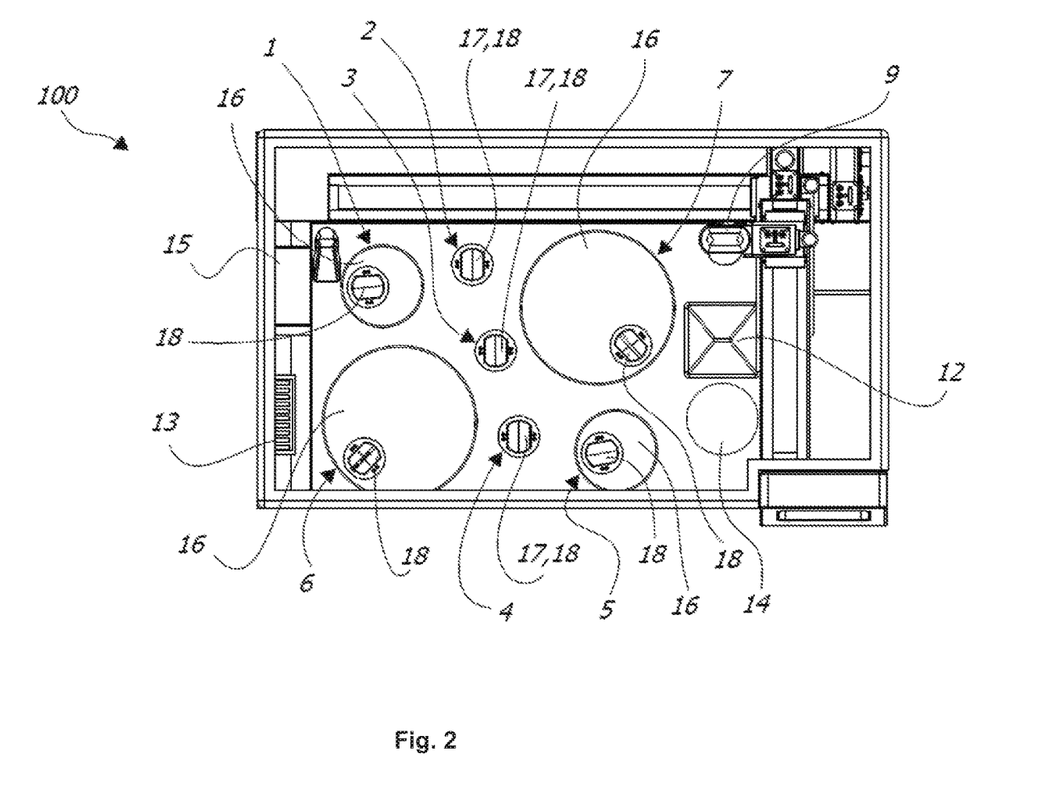
FIG. 2 is a plane view of the tissue processor shown in FIG. 1.
Figure 3:
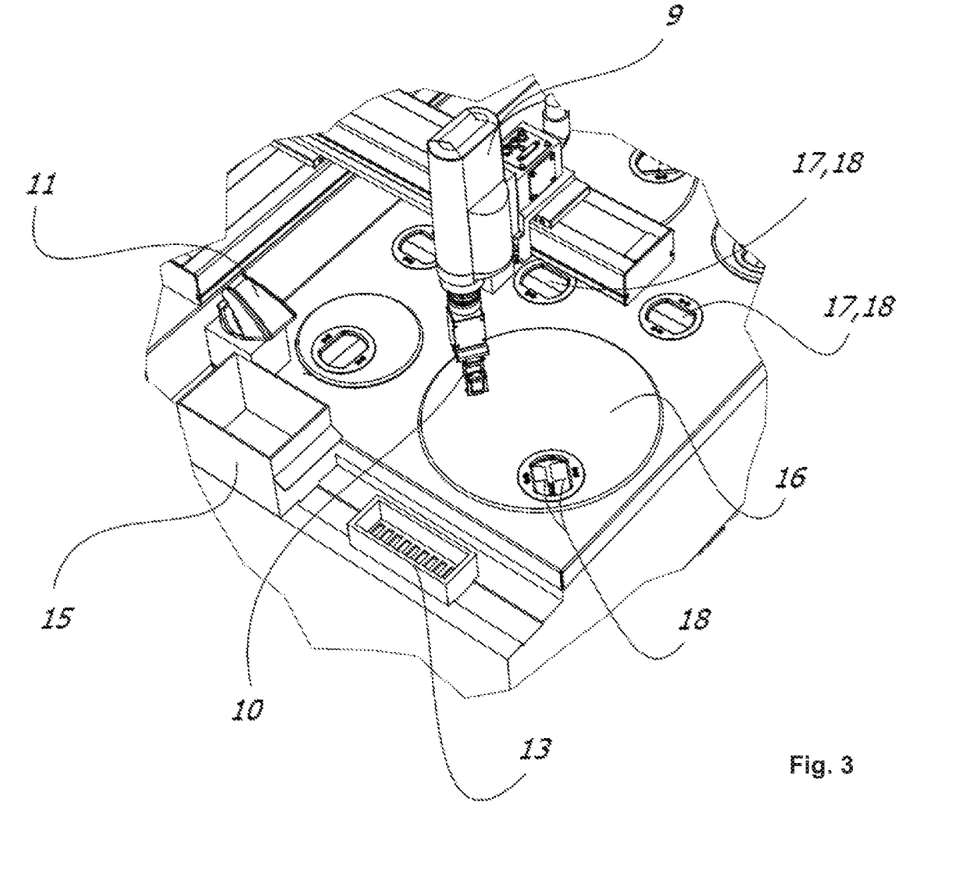
FIG. 3 is a top view of the tissue processor shown in FIG. 1.

FIGS. 1 to 3 show an exemplarily tissue processor 100 for automatically processing (preferably at least processing including embedding) histological tissue specimens. The tissue processor 100 may be provided in a histological laboratory for a histological examination of human or animal tissue or tissue specimens, which have been collected from the human or the animal by an operator, in particular by a surgeon during a surgery. The tissue processor 100 is preferably provided for, but not limited to, tissue specimens up to 5 mm of thickness.

As can be seen in FIGS. 1 to 4, the tissue processor 100 comprises a plurality of (independent) containers (or retorts) 1, 2, 3, 5, 6, 7 each being provided for a respective histological process, e.g., fixing, flushing, rinsing, dehydrating, clearing, and/or impregnating and/or embedding, for processing at least one tissue carrier carrying a tissue specimen. The containers 1, 2, 3, 5, 6, 7 may comprise/include at least two, preferably seven, containers. In the particularly preferred embodiment as shown in FIGS. 1 to 4, in particular in FIG. 4, the containers comprise/include a container 1 for fixing, a container 2 for flushing, two containers 3, 4 for rinsing, a container 5 for dehydrating, a container 6 for clearing, and a container 7 for impregnating and embedding.

Each container may hold a specific liquid for the respective histological process, e.g. reagents such as formalin, ethanol, isopropyl alcohol, wax etc. suitable for processing a tissue carrier in the respective histological process. For the histological processes of fixing, flushing, rinsing, dehydrating, clearing, impregnating and embedding the following reagents are preferably used: for fixing, a fixative such as formalin and/or formalin substitutes; for flushing, a mix of ethanol and water, preferably a mix of about 30% water and 70% ethanol, capable of rinsing the fixative from the tissue specimen and the tissue carrier, thus reducing the contamination of formalin in the following alcoholic reagents that may eventually result in salts precipitation; for rinsing, a mix of ethanol and water, the ethanol preferably having a content between 95% and 100%, and capable to remove the residual of water, thus preparing the tissue carrier for the following dehydration; for dehydrating, e.g. pure ethanol; for clearing, e.g. isopropyl alcohol or xylene; for impregnating and embedding, e.g., paraffin wax.

The containers may be provided in vicinity to each other, e.g., distributed on two or three rows lying next to each other, wherein each row may comprise at least two containers. In the preferred embodiment shown in FIGS. 2 to 3, the containers are distributed on three rows lying next to each other: the first row comprising two containers, e.g. containers 1, 6, the second row comprising three containers, e.g. containers 2, 3, 4, and the third row comprising two containers, e.g. containers 5, 7, wherein, preferably, the second row lies between the first and the third row. As such, the containers are not necessarily aligned one after the other (in one single line) and the arrangement and the order of such containers in the tissue processor is not dependent on the process sequence with which the tissue carriers are placed in such containers, e.g., the first container in which the tissue carriers are put during the process (i.e., the container for fixing) can be displaced everywhere in the tissue processor, not necessarily in first position and not necessarily close to the second container in which the tissue carriers are put during the process (i.e., the container for flushing). As can be seen in particular in FIG. 1, the tissue processor 100 may further comprise a housing 8 for housing at least the containers, preferably in a lower part of the housing 8.

Each of the containers may comprise a retainer (not shown) being provided inside of the respective container. The retainer is provided for storing one or more tissue carriers inside of the respective container. In other words, the retainer and the respective container, respectively, may have a capacity for storing one or more tissue carriers inside of the respective container. The capacity may depend on the processing time of the respective histological process inside of the respective container. As such, the longer the processing time of the histological process is, the greater is the capacity of the respective container. The capacity particularly depends on the average time of stay of each single tissue carrier in the respective container and of the loading of the tissue carrier. The retainer (or the respective container) is preferably designed such that the retainer (or container) can accommodate at least one tissue carrier every 90 seconds. In the preferred embodiment shown in FIGS. 1 to 4, containers 6, 7, respectively, may have the longest processing time and, thus, the maximum capacity for storing tissue carriers. Furthermore, the containers 2, 3, 4, respectively, may have the shortest processing time and, thus, the smallest capacity for storing tissue carriers. The capacity and processing time in each of the containers 1, 5 may be intermediate with respect to the capacity and processing time of the other containers. Storing tissue carriers in the retainer may be accomplished by corresponding means such as slots in the retainer for positioning and orientating a tissue carrier to be stored in the retainer.

As shown in FIGS. 1, 2 and 3, in particular in greater detail in FIG. 3, the tissue processor 100 further comprises a robotic arm 9 for handling a tissue carrier between the containers for being processed in each of the containers. The robotic arm 9 is thus designed such that the robotic arm can handle, i.e. transfer, a tissue carrier from one container to another container preferably from container 1 to container 2, from container 2 to one of the containers 3 or 4, optionally from container 3 to container 4, from one of the containers 3 or 4 to container 5, from container 6 to container 7. The robotic arm 9 is therefore provided to reach each of the containers. The robotic arm 9 may comprise a plurality of movement axes, in particular linear and/or rotary axes, so that a tissue carrier being handled by the robotic arm 9 can reach each of the containers, in particular a free slot in the retainer of each of the containers. In the preferred embodiment shown in FIGS. 1 to 3, the robotic arm 9 comprises four axes including three linear axes and one rotary axis. At least some of the movement axes, preferably the linear axes, may be provided along the length, the width and/or the height of the tissue processor 100, i.e. may be provided perpendicular to each other.

The robotic arm 9 may further comprise a handling means 10 for handling and gripping, in particular for holding and releasing, a tissue carrier. The handling means 10 may be provided at a distal end of the robotic arm 9. In the preferred embodiment, the handling means 10 comprises fingers for gripping/holding a tissue carrier. However, the handling means 10 may also comprise any other mechanical and/or electronic means for securely gripping and handling a tissue carrier. The handling means 10 may be pivotably provided at the distal end of the robotic arm 9, so that a tissue carrier can be precisely orientated in at least one plane.

The robotic arm 9 may be provided in the housing 8, preferably in an upper part of the housing 8. As such, the robotic arm 9 can safely handle tissue carriers without being a danger, e.g., for an operator. In particular, the upper part of the housing 8 may comprise doors, so that an operator can access the robotic arm 9 and at the same time preferably the containers, which may be also accessed via the upper part of the housing 8.

The tissue processor 100 further comprises a (electronic) control unit (not shown) for automatically controlling the histological process in each of the containers and for automatically controlling the robotic arm 9. Preferably, the control unit is provided inside of the housing 8, more preferably in the lower part of the housing 8. According to the invention, the control unit is configured such that the robotic arm 9 handles the tissue carrier between the containers while the histological process in each of the containers continues in an uninterrupted fashion, so that the execution of the process for each tissue carrier is independent from the loading order and/or process duration of other tissue carriers being processed in the containers. In particular, the control unit may comprise a processor executing commands for controlling the robotic arm 9 and the histological process in each of the containers. As such, the tissue processor 100 is able to concurrently process and handle tissue carriers, while during one handling step of the robotic arm 9 only one tissue processor is being handled. As such, the tissue processor 100 can process many tissue carriers in a short time and in a high quality, even though the robotic arm 9 always handles only one tissue carrier The tissue processor 100 may further comprise a reading unit 11, e.g. an optical reading unit such as a barcode scanner and/or a near field technology reader such as an RFID reader, preferably being provided in the housing 8, preferably in an upper part of the housing 8.

The reading unit 11 is provided for reading a priority for prioritized processing of a tissue carrier over other tissue carriers. The priority may be a number indicating the urgency of a tissue carrier. For example, the higher the number is the higher is the urgency of the tissue carrier. The priority may range from "low" over "medium" to "high".

Additionally or alternatively, the optical reading unit 11 is provided for reading tissue characteristics of a tissue carrier. The tissue characteristics are representative of tissue specimens carried by the tissue carrier. The tissue characteristics may comprise tissue dimension, e.g., tissue thickness, tissue width, tissue length, tissue volume. Tissue characteristics may also include other physical characteristics of the tissue such as weight or the like. Furthermore, the tissue characteristics may additionally or alternatively comprise tissue type, e.g. the organ from which the tissue was taken from.

The priority and/or the tissue characteristics are provided with respect to a tissue carrier, e.g. by means of a one dimensional (1D-) or two dimensional (2D-) barcode (matrix barcode such as a Datamatrix, a QR-Code, a Micro QR-code, Aztec code, etc.) and/or by means of near field technology (e.g., an RFID chip). The priority and/or tissue characteristics may be provided as a binary code in the barcode and/or in the near field technology. However, the priority and/or the tissue characteristics may also be provided on a distanced server, e.g. on a Local Area Network (LAN), so that the barcode and/or the near field technology provides a unique identification of the tissue carrier, i.e. the tissue (specimen) being provided on the tissue carrier, linked to the priority and/or the tissue characteristics being provided on the distanced server.

Furthermore, the reading unit 11 is connected to the control unit for forwarding the priority and/or the tissue characteristics to the control unit. In other words, the reading unit 11 may monitor a certain area surrounding the reading unit 11 for reading a priority and/or tissue characteristics being provided in that area, and subsequently forward the priority and/or the tissue characteristics to the control unit. In case the reading unit 11 forwards a unique identification of the tissue carrier being linked with the priority and/or tissue characteristic to the control unit, the control unit may be connected to a Local Area Network, in particular to be able to share data with a Laboratory Information System (LIS), so that the control unit can receive the linked priority and/or tissue characteristics.

With the reading unit 11 being connected to the control unit, the control unit is configured such that tissue carriers are processed based on their priorities and/or tissue characteristics. Based on the priority and/or tissue characteristics, the control unit may generate a protocol for the robotic arm 9 including, in particular, the sequence of the containers, e.g. in the form of coordinates, and the respective processing time in a container. Based on the protocol, the robotic arm 9 then handles the respective tissue carrier.

As can be seen in FIGS. 1 and 2, the tissue processor 100 may comprise a dripping area 12 being provided to collect residual liquid of a tissue carrier, in particular before the tissue carrier is processed in container 7 for impregnating and embedding. With the dripping area 12, the control unit is configured such that the robotic arm 9 handles a tissue carrier for dripping off residual liquid over the dripping area 12. This may be accomplished by the robotic arm 9 imparting an impulse on the tissue carrier. Imparting the impulse may be affected by a (soft) vibration, wherein the vibration is preferably effected by the control unit moving the axis of the robotic arm 9, in particular the axis of the handling means 10, so that the vibration acts on the tissue carrier for dripping off residual liquid of the tissue carrier. The dripping area 12 may be connected, e.g. via a tube, to a tank (not shown) for collecting the residual liquids/drops collected by the dripping area 12.

As can be seen in FIGS. 1, 2 and 3, the tissue processor 100 may further comprise a loading area/bay 13 for loading tissue carriers on the tissue processor 100 for being processed by a tissue processor 100. In particular, the loading area 13 may be provided so that tissue carriers can access the tissue processor 100 from outside of the tissue processor 100 without moving the hand of an operator inside of the tissue processor 100. Thus, the loading area 13 may provide an entrance of the tissue processor 100 for the tissue carriers, while the histological process in each of the containers continues in an uninterrupted fashion. In a particularly preferred embodiment, the loading area 13 is a conveyor belt or a transfer line. Additionally or alternatively, the loading area 13 may also be moved manually by an operator or robotically.

With the loading area 13 being provided in the tissue processor 100, the control unit is configured such that the robotic arm 9 picks up a tissue carrier from the loading area 13 for being processed in the containers. In particular, the control unit may be configured such that the control unit permanently moves the loading bay 13, in particular the conveyor, in a direction inside of the tissue processor 100, so that tissue carriers can be placed one-by-one in the loading area 13 for being immediately picked up by the robotic arm 9 for being processed in the containers. However, the control unit may also be configured such that the control unit moves the loading bay 13, in particular the conveyor, alternately in a direction inside and outside of the tissue processor 100, so that, e.g., a box with a plurality of tissue carriers can be placed on the loading area 13 for being moved inside of the tissue processor 100 for being processed by the containers and for subsequently being moved outside of the tissue processor 100 for being picked up by an operator.

In particular, the control unit may be configured such that when a tissue carrier is provided on the loading area 13, the reading unit 11 reads the priority and/or the tissue characteristic as explained above.

As can be seen in FIGS. 1 and 2, the tissue processor 100 may further comprise a cooling container 14 for cooling tissue specimens, wherein the cooling container 14 preferably provides a temperature of about −20° C. for the tissue carrier, i.e. tissue specimens. Cooling the tissue specimens may be accomplished by means of a cooling liquid, in particular provided inside of the cooling container 14, wherein the cooling liquid is preferably cooled by means of a suitable cooling element 25, e.g., a Peltier thermoelectric cooler, so that the cooling liquid has a suitable temperature for cooling, e.g. −20° C. Preferably, the cooling liquid has a specific weight similar to paraffin wax (e.g., ethanol) and a freezing point lower than the temperature at which the cooling liquid is maintained. The cooling liquid is preferably immiscible with paraffin wax. With the cooling container 14, the control unit is configured such that the robotic arm 9 dips a tissue carrier in the cooling container 14 after being processed in the containers. Dipping the tissue carrier in the cooling container 14 preferably happens after the tissue carrier has been processed in container 7, i.e. after impregnating and embedding. In particular, the cooling container 14 may be connected to the control unit such that the control unit controls the temperature of the cooling container 14 and preferably also the cooling liquid, in particular its level, being provided inside of the cooling container 14.

The tissue processor 100 may further comprise an unloading area 15, which in the preferred embodiment according to FIGS. 1, 2 and 3 is a collecting box. The unloading area 15 may, however, be any other means being suitable for collecting tissue carriers. Preferably, the unloading area 15 is provided next to the loading area 13. In particular, the unloading area 15 may be integrated in the loading area 13 such that the loading area 13 also provides the (function) of the unloading area 15. With the tissue processor 100 comprising the unloading area 15, the control unit is configured such that the robotic arm 9 handles a tissue carrier for being collected by the unloading area after being processed in the containers. Preferably, tissue carriers are being collected by the unloading area 15 after being cooled by the cooling container 14. The unloading area 15 may be provided such that an operator can access the unloading area 15 from outside of the tissue processor 100. In particular, the unloading area 15 may be provided in the housing 8, preferably in the upper part of the housing 8, so that an operator can access the unloading area 15 via the housing 8.

Optionally, the tissue processor 100 may comprise a buffer area (not shown) provided to collect and temporarily store tissue carriers with tissue specimens, if an expected loading rate of one tissue carrier every about 90 second is exceed. This may happen, if the tissue processor 100 serves more than one grossing area.

As can be seen, in particular, in FIGS. 1 and 2, each of the containers may comprise a lid 16, 17 for sealingly closing the respective container, wherein the lid 16, 17 is designed such that the robotic min 9 can access the container via the lid 16, 17 for placing a tissue carrier in the container. Sealingly closing a container by means of the lid 16, 17 may be accomplished by means of sealings being provided between the lid 16, 17 and the container, and, in case the robotic aim 9 accesses the container, between the lid 16, 17 and the robotic arm 9.

The lid 16, 17 may comprise an accessing means 18, preferably one or more flaps, for accessing the container. As can be seen for containers 2, 3, 4, the accessing means 18 may form the lid 17. This is advantageous, in particular, for containers having a small capacity. However, as can be exemplary seen for containers 1, 5, 6, 7, the accessing means 18 may be provided as a part of the lid 16, i.e. may cover a hole or an opening in the lid 16. This is advantageous, in particular, for containers having greater capacity.

The accessing means 18 is designed such that the accessing means can be moved by the robotic arm 9 between a closed position for sealingly closing the container and an opened position for accessing the container. That is, the robotic arm 9 may be brought in contact with the accessing means 18 for opening the accessing means 18 and may be released from the accessing means 18 for closing the accessing means 18. When the robotic arm 9 opens the accessing means 18, the contact between the accessing means 18 and the robotic arm 9 preferably seals the container from outside of the container. In particular, the accessing means 18 may be biased, e.g. by means of a spring, for being moved in the closed position. However, in an alternative embodiment, the accessing means 18 may also be opened and closed by means of the control unit, so that when the robotic arm 9 is in the vicinity of the accessing means 18, the control unit opens the accessing means 18, wherein the control unit closes the accessing means 18, when the robotic arm 9 moves away from the accessing means 18 in a direction outside of the container.

In a particularly preferred embodiment, the lid 16, 17 of at least one container of the containers, preferably the lid 16 of each of the containers having a capacity of more than two tissue carriers, is movably, in particular pivotably, e.g. around an axis of a retainer being provided inside of the container. As such, the lid 16, 17 may be moved automatically, preferably directly by means of the control unit, so that the robotic arm 9 can find a free space for the tissue cassette in the container, in particular in the retainer. When using the control unit for moving the lid 16, 17, a means, e.g. an optical reader, for finding a free space for a tissue carrier in the container may be provided inside of the container. Said means may thus observe the container for a free space for a tissue carrier and subsequently instruct the control unit for moving the lid 16, 17, so that the accessing means stays flush with the free space. After that, the control unit instructs the robotic arm 9 for being moved to the accessing means 18, so that the robotic arm 9 penetrates the container via the accessing means 18 and directly places the tissue carrier in the free space in the container.

Alternatively or additionally, the lid 16, 17 may be moved indirectly, i.e. by means of the robotic arm 9, so that the robotic arm 9 can find a free space for the tissue carrier in the container. Preferably the lid 16, 17 is being moved by means of the robotic arm 9 penetrating the accessing means 17. Therefore, additional means for observing the container or the retainer for free space for the tissue cassette and additional means for moving the lid 16, 17 can be omitted. In other words, the robotic arm 9 itself searches for a free space for a tissue carrier inside of the container, while the movability of lid 16, 17 provides the necessary freedom for the movements of the robotic arm 9, so that the lid 16, 17 moves together with the robotic arm 9. Finding a free space for a tissue carrier in the container by means of the robotic arm 9 may be accomplished by suitable means, e.g. an optical camera, being provided on the distal end of the robotic arm 9.

Figure 4:
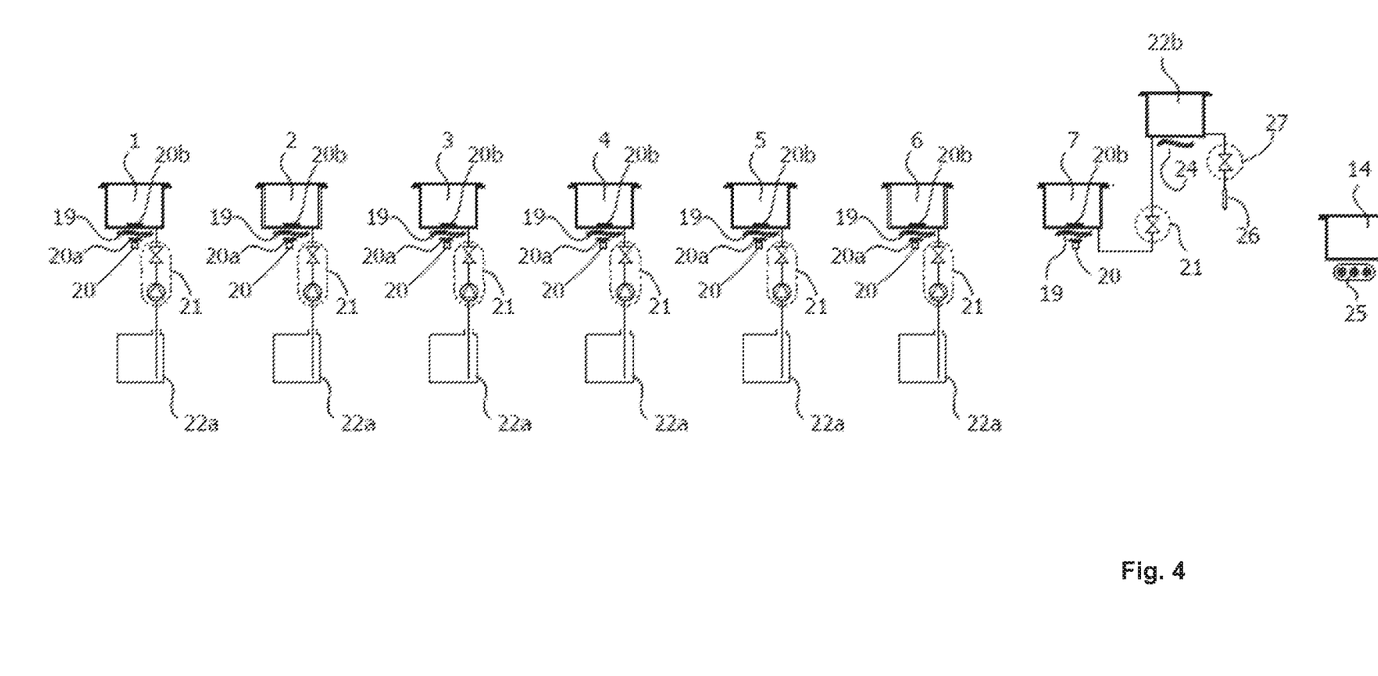
FIG. 4 is a functional diagram of a part of the tissue processor shown in FIG. 1.

As can be seen in FIG. 4, each of the containers may comprise a heater 19, a stirrer 20, and/or a pump 21. The heater 19, the stirrer 20, and/or the pump 21 are connected to the control unit, so that the control unit can control the respective means. In particular, the control unit may control the pump 21 such that a liquid, e.g. a reagent, inside of a container is being controlled to maintain or vary a certain level of the liquid inside of the container. As such, the pump 21 may fill and drain the respective container, preferably only while no tissue carriers are being processed in the container. For example, the control unit and the pump 21 may vary the level of the liquid inside of the container based on the liquid escaping the respective container and/or the number of tissue carriers being processed inside of the container. More specifically, the control unit may reduce the level of the liquid in the container, when a reduced number of tissue carriers, in particular no tissue carriers, are being processed inside of the container.

Furthermore, the control unit may control the heater 19 and/or the stirrer 20 for properly processing tissue carriers in the respective container. The heater 19 preferably comprises electrical resistances and/or a generator for generating an electromagnetic field (e.g., a microwave). The stirrer 20 may comprise a stirring motor 20a and a stirring bar 20b, wherein the stirring bar 20b, e.g. a magnet, is moved by the motor 20a for stirring movement.

Each of the containers may further comprise a tank 22a, 22b, e.g. one tank or two to five tanks per container, for providing the respective liquid. Providing more than one tank for each of the containers can provide more volume of liquid/reagents thus extending the time between exhaust reagent replacement. The tank 22a, 22b may be fluidly connected to the respective container via the pump 21, so that the liquid is pumped from the tank 22a, 22b into the container.

With respect to the container 7 for impregnating and embedding, the tank 22b may be provided as a paraffin wax reservoir. In particular, the control unit may control the pump 21 of the container 7 such that the liquid in container 7, in particular the paraffin wax, is automatically refilled, so that the container 7 maintains a stable level of its liquid. The tank 22b may comprise a heater 24 for heating the liquid inside of the tank 22b. Preferably, the pump 21 of the tank 22b may only comprise a valve so that the liquid of the tank 22b flows from the tank 22b to the container 7 by means of gravity. As such, the tank 22b is provided above the container 7.

The tank 22b of the container 7 is preferably provided in an upper part of the housing 8. The other tanks 22a are preferably provided in a lower part of the housing 8.

The tank 22b may further comprise a wax dispensing nozzle 26 for dispensing and dosing a defined amount of wax to a tissue carrier being held next to the wax dispensing nozzle 26 by means of the robotic arm 9. The wax dispensing nozzle 26 may be connected to the tank 22b by way of a valve 27 so that the liquid of the tank 22b flows from the tank 22b to the wax dispensing nozzle 26 by means of gravity. As such, the wax dispensing nozzle 26 is provided in a lower part of the tank 22b. The valve 27 may be connected to the control unit so that the control unit automatically controls dispensing and dosing of wax flowing through the wax dispensing nozzle 26.

As can be seen in FIG. 1, the tissue processor 100 may further comprise a user interface 23, for example a touch screen or a display, for observing and/or controlling the process of processing histological tissue specimens inside of the tissue processor 100. As such, the user interface 23 may be functionally connected to the control unit for setting up the respective parts being functionally connected to the control unit. In particular, the user interface 23 may provide access to a Local Area Network, e.g. to an LIS, so that an operator can share data, e.g. priorities and/or tissue characteristics, with the Local Area Network and thus with the tissue processor 100. The user interface 23 may also provide data with respect to the process outcome of each of the tissue carriers.

Figure 5:
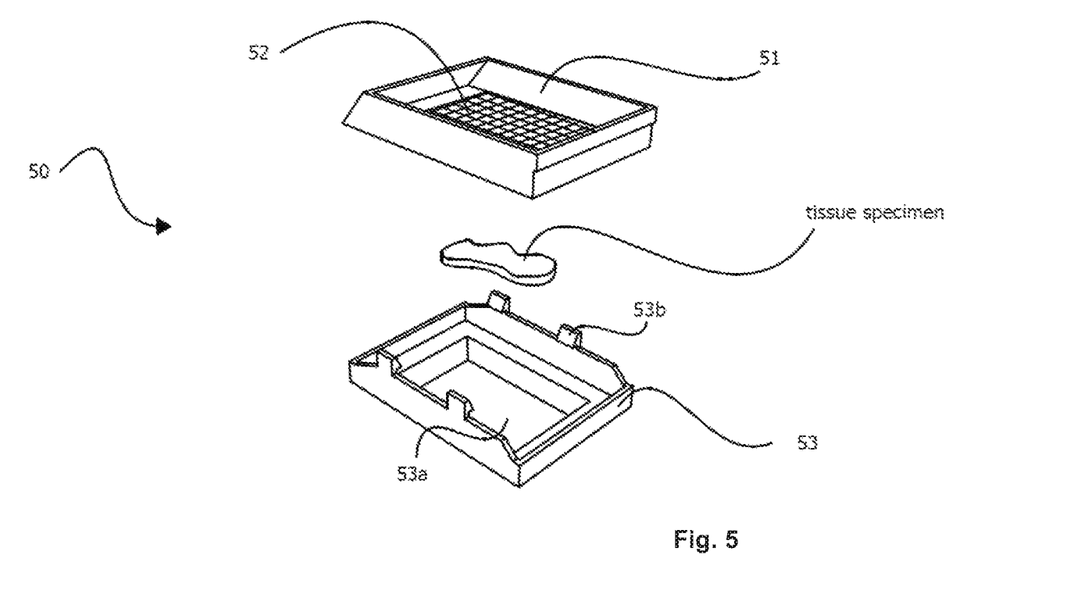
FIG. 5 is an exploded view of a preferred tissue carrier.
Figure 6:
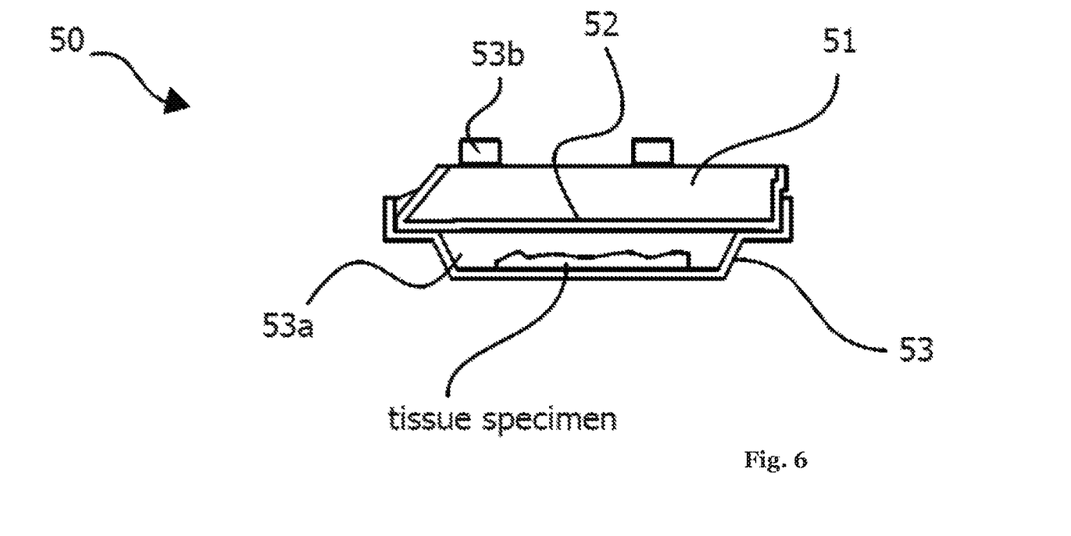
FIG. 6 is a side view of the tissue carrier shown in FIG. 5.

FIGS. 5 and 6 show a preferred design for a tissue carrier. The tissue carrier 50 may comprise a tissue cassette 51 for carrying and holding a tissue specimen. The tissue cassette 51 comprises, in particular, a perforated base 52 so that liquid can flow through the base 52. The tissue carrier 50 may further comprise a base mold 53 for also carrying a tissue specimen, wherein the tissue cassette 51 is connectable with the base mold 53 for enclosing a chamber 53a for the tissue specimen being carried by the base mold 53. The tissue cassette 51 may be connected to the base mold 53 by means of a snap fit. The snap fit may be provided by means of a protrusion 53b being provided on the base mold 53, preferably on a side wall of the base mold 53, wherein the protrusion 53b engages with the tissue cassette 51. The connected state of the tissue cassette 51 and the base mold 53 is shown in FIG. 6. It can be seen that the tissue specimen is enclosed by the tissue cassette 51, in particular the base 52, and the base mold 53. By way of this configuration, the base mold 53 connected/attached to the tissue cassette 51, preferably the chamber 53a, may hold a quantity of wax, in particular from the process of impregnating and embedding in the container 7, to embed the tissue specimen inside the tissue carrier 50, the chamber 53a enclosing the tissue specimen, respectively.

In the following, a preferred method for processing histological tissue specimens by means of the tissue processor 100 is described:

After the grossing, an operator, e.g. an histotechnician, puts a tissue carrier in the loading area 13 of the tissue processor 100.

When the tissue carrier is available in the loading area 13, the robotic arm 9, preferably the handling means 10 of the robotic arm 9, picks up the tissue carrier and handles the tissue carrier to be moved under the reading unit 11 to identify the tissue carrier, i.e. to read the priority and/or the tissue characteristics. Thus, the control unit can select the right process for the tissue carrier, i.e. the tissue specimen being provided on the tissue carrier.

In the next step, the robotic arm 9 handles the tissue carrier from the loading area 13 to be transferred vertically to the containers for being processed in each of the containers.

When the robotic arm 9 handles the tissue carrier for being processed in the container 1, the robotic arm 9 accesses the container 1 via the lid 16, preferably by way of the accessing means 18, in particular by way of the one or more flaps. More specifically, the robotic arm 9, in particular the handling means 10, pushes down the accessing means 18 to open the same. Once the robotic arm 9, in particular the handling means 10, penetrates the accessing means 18, the robotic arm 9 can move freely together with the lid, in particular roundly, to find a free/proper space/slot in the retainer for the tissue carrier inside of the container 1. The robotic arm 9 then releases the tissue carrier and retracts out of the container. The accessing means 18 subsequently returns to the closed position, for example by means of the spring, to sealingly close the lid 16.

The tissue carrier then remains in the container 1 for a specific time defined by the protocol being linked to the tissue characteristics and/or the priority.

In the meantime, i.e. while the histological process for processing the tissue carrier in the container 1 continues in an uninterrupted fashion, the robotic arm 9 is ready for managing other tissue carriers.

As soon as the time for processing the tissue carrier in container 1 has expired, the robotic aim 9 takes the tissue carrier out of the container 1 and handles the tissue carrier in the next container, i.e. container 2, as explained with respect to the container 1.

Subsequently, the aforementioned steps for handling the tissue carrier between the containers 1 and 2 are repeated for the containers 3, 4, 5, 6 and 7 correspondingly.

Before the step of processing the tissue carrier in the container 7, i.e. the last container for histologically processing the tissue carrier, the robotic aim 9 handles the tissue carrier from the previous container, e.g. container 6, and handles the tissue carrier for dripping off residual liquid over the dripping area 12. Preferably, dripping off is accomplished by vibration, e.g. by soft vibration, being applied to the tissue carrier by the robotic aim 9. This fosters the dripping of the residual liquid, in particular of drops, of the previous liquid (e.g. reagent). This is useful to reduce the cross-contamination between the liquids and the wax contained in container 7 for impregnating and embedding.

After dripping off residuals over the dripping area 12, the robotic arm 9 handles the tissue carrier to be processed in container 7, i.e. to be moved inside of the container 7. In container 7, the wax impregnation and the wax embedding are performed. First, the robotic arm 9, in particular the handling means 10, handles the tissue carrier, so that the tissue carrier tilts vertically in container 7 for a time being defined by the protocol to do the wax impregnation. In a preferred embodiment, when impregnation is done, the robotic aim 9 executes the following steps: the robotic arm 9 extracts the tissue carrier out from the wax, handles the tissue carrier to be tilted in a horizontal position, dips the horizontal tissue carrier in the wax contained in the container 7 and then extracts the tissue carrier out from the wax. In this way, the tissue carrier, in particular the base mold 53 attached to the tissue cassette 51, holds a quantity of wax enough to embed the tissue specimen inside of the tissue carrier. Preferably, the control unit automatically refills the reagents of the container 7, in particular paraffin wax, using the liquid being provided in the tank 22b, i.e. the paraffin wax reservoir, e.g. by means of the pump 21. As such, a stable level of liquid inside the container 7 is maintained. Thus, the quantity of liquid removed from the container 7 to embed tissue specimen is automatically restored.

In another embodiment, when the impregnation is done, the robotic arm 9 extracts the tissue carrier out from the wax, then handles the tissue carrier to be tilted in a horizontal position and moves the horizontal tissue carrier under the wax dispensing nozzle 26. Then, the wax dispensing nozzle 26 doses a proper amount of wax inside the tissue carrier. In this way, the tissue carrier, in particular the base mold 53 attached to the tissue cassette 51, contains a quantity of wax enough to embed the tissue specimen inside of the tissue carrier.

When the process for processing the tissue carrier inside of the container 7 is finished, i.e. in particular after wax embedding, the robotic arm 9 handles the horizontal tissue carrier to be dipped in the cooling container 14 for about 30 seconds. Cooling is preferably accomplished by way of a liquid having a temperature of about −20° C. As such, the external surface of wax of the tissue specimen inside of the tissue carrier is quickly solidified, thus creating a thick solid wax skin of the tissue specimen. The wax embedded tissue specimen inside of the tissue carrier, in particular the tissue cassette, is usually called histological block.

In the final step, the processing and, thus, embedding of the tissue carrier by means of the tissue processor 100 is finished and the robotic arm 9 handles the tissue carrier to be tilted in a vertical position over the cooling container 14 to drip the remaining drops of cooling liquid, then the robotic arm 9 handles the tissue carrier for being collected by the unloading area 15, in particular by the collecting box or a proper automatic transfer.

The tissue processor 100 is thus able to manage multiple tissue carriers at the same time: while one tissue carrier is put inside one container, then the tissue carrier stays there for a certain amount of minutes. During that time, the robotic arm 9 is not busy with that tissue carrier and can thus manage other tissue carriers. Thus, the tissue processor 100 achieves in particular a more efficient and effective process for processing (including embedding) tissue specimens, so that the quality and speed of processing histological specimens is considerably improved.

In the table shown in FIG. 7, an example, i.e. an exemplary protocol for processing (i.e., in particular, fixing, flushing, rinsing, dehydrating, clearing, impregnating and embedding) tissue specimens or biopsies, for processing tissue carriers based on their tissue characteristics, in particular tissue thickness, is shown. The table shows three tissue carriers carrying tissue specimens having a tissue thickness of 1 mm, 2 mm and 3 mm, respectively. It can be seen that the greater the tissue dimension/thickness is, the longer is the processing time, in particular in containers 1, 5, 6, 7, respectively.

In the table shown in FIG. 8, it is exemplary shown by means of a timeline how three tissue carriers using the protocol of the table shown in FIG. 7 are processed concurrently by means of the priority and/tissue characteristics: the first tissue carrier (cassette 1) comprises the tissue specimen with a thickness of 1 mm and has a normal priority, the second tissue carrier (cassette 2) comprises the tissue specimen with a thickness of 3 mm and has a high priority, and a third tissue carrier (cassette 3) comprises the tissue specimen with a thickness of 2 mm and has a normal priority. As can be seen in the start timeline at 2:11:00, both cassette 2 and cassette 3 need to be handled by the robotic arm 9 at the same time. The robotic arm 9 is expected to move cassette 3 at 2:11:00 but is busy transferring the cassette 2 from 2:10:55 to 2:11:10. However, since cassette 2 has a higher priority than cassette 3, cassette 2 is being transferred, while cassette 3 is delayed at 2:11:00. In this table, one can also see that tissue carriers are preferably loaded at 90 seconds from each other.

It should be clear to a skilled person that the embodiment shown in the figures is only a preferred embodiment, but that, however, also other designs of a tissue processor 100 may be provided.

The invention claimed is:

1. A tissue processor (100) for automatically processing histological tissue specimens, the tissue processor (100) comprising:
   a plurality of containers (1, 2, 3, 4, 5, 6, 7) each being provided for a respective histological process for processing at least one tissue carrier inside of a respective container (1, 2, 3, 4, 5, 6, 7),
   at least one robotic arm (9) for transferring a tissue carrier between the plurality of containers (1, 2, 3, 4, 5, 6, 7) for being processed in each of the containers (1, 2, 3, 4, 5, 6, 7), and
   a control unit for controlling the histological process in each of the plurality of containers (1, 2, 3, 4, 5, 6, 7) and for controlling the at least one robotic arm (9),
   wherein the control unit is configured such that the at least one robotic arm (9) transferring a single tissue carrier at a time between the plurality of containers (1, 2, 3, 4, 5, 6, 7) while said histological process in each of the plurality of containers (1, 2, 3, 4, 5, 6, 7) operates continuously during the transferring of said single tissue carrier by the at least one robotic arm (9), wherein the tissue processor is able to manage multiple tissue carriers at the same time, so that the processing of for each tissue carrier in any loading order is independent from a process duration of other tissue carriers being processed in the plurality of containers (1, 2, 3, 4, 5, 6, 7).

2. The tissue processor (100) according to claim 1, further comprising a reading unit (11),
   for reading a priority for prioritized processing of the tissue carrier over other tissue carriers, and/or
   for reading tissue characteristics of the tissue carrier, the tissue characteristics comprising tissue dimension and/or tissue type,
   the priority and/or the tissue characteristics being provided with respect to the tissue carrier, wherein the reading unit (11) is connected to the control unit for forwarding the priority and/or the tissue characteristics to the control unit, wherein the control unit is configured such that the tissue carriers are processed based on their priorities and/or tissue characteristics.

3. The tissue processor (100) according to claim 1, further comprising a loading area (13), wherein the control unit is configured such that the at least one robotic arm (9) picks up the tissue carrier from the loading area (13) for being processed in the plurality of containers (1, 2, 3, 4, 5, 6, 7).

4. The tissue processor (100) according to claim 1, further comprising a cooling container (14) for cooling tissue specimens, the control unit is configured such that the at least one robotic arm (9) dips the tissue carrier in the cooling container (14) after being processed in the plurality of containers (1, 2, 3, 4, 5, 6, 7).

5. The tissue processor (100) according to claim 4, further comprising an unloading area (15), wherein the control unit is configured such that the at least one robotic arm (9) handles the tissue carrier for being collected by the unloading area (15) after being processed in the plurality of containers (1, 2, 3, 4, 5, 6, 7) and after being cooled by the cooling container (14).

6. The tissue processor (100) according to claim 1, wherein each of the plurality of containers (1, 2, 3, 4, 5, 6, 7) comprises a lid (16, 17) for sealingly closing the respective container, the lid (16, 17) being designed such that the at least one robotic arm (9) can access the plurality of container (1, 2, 3, 4, 5, 6, 7) via the lid (16, 17) for placing the tissue carrier in the container (1, 2, 3, 4, 5, 6, 7).

7. The tissue processor (100) according to claim 6, wherein the lid (16, 17) comprises an accessing means (18), for accessing the plurality of container (1, 2, 3, 4, 5, 6, 7), wherein the accessing means (18) can be moved by the at least one robotic arm (9) between a closed position for sealingly close the container (1, 2, 3, 4, 5, 6, 7) and an opened position for accessing the container (1, 2, 3, 4, 5, 6, 7), wherein the accessing means (18) is biased for being moved in the closed position.

8. The tissue processor (100) according to claim 7, wherein the lid (16, 17) of at least one container of the plurality of containers (1, 2, 3, 4, 5, 6, 7) is moveably, in particular pivotably, provided on the container (1, 2, 3, 4, 5, 6, 7) for being moved automatically by means of the control unit, and/or by means of the at least one robotic arm (9) penetrating the accessing means (18), so that the at least one robotic arm (9) can find a free space for the tissue carrier in the container (1, 2, 3, 4, 5, 6, 7).

9. The tissue processor (100) according to claim 1, wherein each of the plurality of containers (1, 2, 3, 4, 5, 6, 7) comprises a retainer for storing one or more tissue carriers, the retainer having a capacity being dependent on the processing time of the respective histological process, so that the longer the processing time the greater the capacity.

10. The tissue processor (100) according to claim 1, wherein the plurality of containers (1, 2, 3, 4, 5, 6, 7) comprise
   a container (1) for fixing, having a capacity of 25 tissue carriers,
   a container (2) for flushing, having a capacity of two tissue carriers,
   at least one container (3, 4) for rinsing,
   a container (5) for dehydrating,
   a container (6) for clearing, and
   a container (7) for impregnating and embedding.

11. The tissue processor (100) according to claim 1, wherein each of the plurality of containers (1, 2, 3, 4, 5, 6, 7) comprises a heater (19), a stirrer (20) and/or a pump (21) for performing the respective histological process, the heater (19), the stirrer (20) and/or the pump (21) being connected to the control unit for being controlled by the control unit.

12. The tissue processor (100) according to claim 1, wherein the at least one tissue carrier (50) is a tissue cassette (51) for carrying a tissue specimen, and
   wherein each of the plurality of containers (1, 2, 3, 4, 5, 6, 7) is adapted to hold a specific liquid for the respective histological process.

13. The tissue processor (100) according to claim 12, wherein the tissue carrier (50) further comprises a base mold (53) for carrying a tissue specimen, and wherein the tissue cassette (51) is connectable with the base mold (53) for enclosing a chamber for the tissue specimen being carried by the base mold (53).

14. The tissue processor (100) according to claim 1, further comprising a dripping area (12), wherein the control unit is configured such that the at least one robotic arm (9) handles the tissue carrier for dripping off residual liquid over the dripping area (12) before the tissue carrier being processed in a container (7) of the plurality of containers (1, 2, 3, 4, 5, 6, 7) being provided for impregnating and embedding.

15. The tissue processor (100) according to claim 2, wherein the reading unit (11) is an optical reading unit.

16. The tissue processor (100) according to claim 7, wherein the accessing means (18) for accessing the plurality of container (1, 2, 3, 4, 5, 6, 7) are one or more flaps.

17. The tissue processor (100) according to claim 8, wherein the lid (16) of each of the plurality of containers (1, 5, 6, 7) having a capacity of more than two tissue carriers is moveably provided on the plurality of container (1, 2, 3, 4, 5, 6, 7) for being moved automatically by means of the control unit, and/or by means of the at least one robotic arm (9) penetrating the accessing means (18), so that the at least one robotic arm (9) can find a free space for the tissue carrier in the container (1, 2, 3, 4, 5, 6, 7).

18. The tissue processor (100) according to claim 14, wherein the control unit is configured such that the at least one robotic arm (9) handles the tissue carrier for dripping off residual liquid over the dripping area (12) by a vibration impulse of the at least one robotic arm (9) before the tissue carrier being processed in a container (7) of the plurality of containers (1, 2, 3, 4, 5, 6, 7) being provided for impregnating and embedding.

19. The tissue processor (100) of claim 1, wherein the at least one tissue carrier (50) comprises a perforated base (52), so that liquid can flow through the perforated base (52).

20. A tissue cassette processing system comprising:
the tissue processor (100) according to claim 1, and
the at least one tissue cassette (51) comprising a base mold (53) for carrying a tissue specimen and for holding a quantity of wax for embedding a tissue specimen inside of the tissue cassette (51), wherein the tissue cassette (51) is connectable with the base mold (53) for enclosing a chamber for the tissue specimen being carried by the base mold (53);
wherein said at least one tissue carrier is said at least one tissue cassette (51).

21. A method for processing histological tissue specimens with a tissue processor (100) comprising steps of:
providing a plurality of containers (1, 2, 3, 4, 5, 6, 7), each being provided for a respective histological process for processing at least one tissue carrier inside a respective container (1, 2, 3, 4, 5, 6, 7),
providing at least one robotic arm (9) for transferring a tissue carrier between the containers (1, 2, 3, 4, 5, 6, 7) for processing in each of the plurality of containers (1, 2, 3, 4, 5, 6, 7),
controlling the histological process in each of the plurality of containers (1, 2, 3, 4, 5, 6, 7) and controlling the at least one robotic arm (9) by a control unit,
handling a single tissue carrier by the at least one robotic arm (9) between the plurality of containers (1, 2, 3, 4, 5, 6, 7) while the histological process in each of the plurality of containers (1, 2, 3, 4, 5, 6, 7) operates continuously during the transferring of said single tissue carrier by the at least one robotic arm (9) between the plurality of containers (1, 2, 3, 4, 5, 6, 7), wherein the tissue processor is able to manage multiple tissue carriers at the same time, so that the processing of each tissue carrier in any loading order is independent from a process duration of other tissue carriers being processed in the plurality of containers (1, 2, 3, 4, 5, 6, 7).

* * * * *